May 10, 1932.  F. A. NEMEC  1,857,321
FLUID CONTROL DEVICE
Filed July 18, 1930
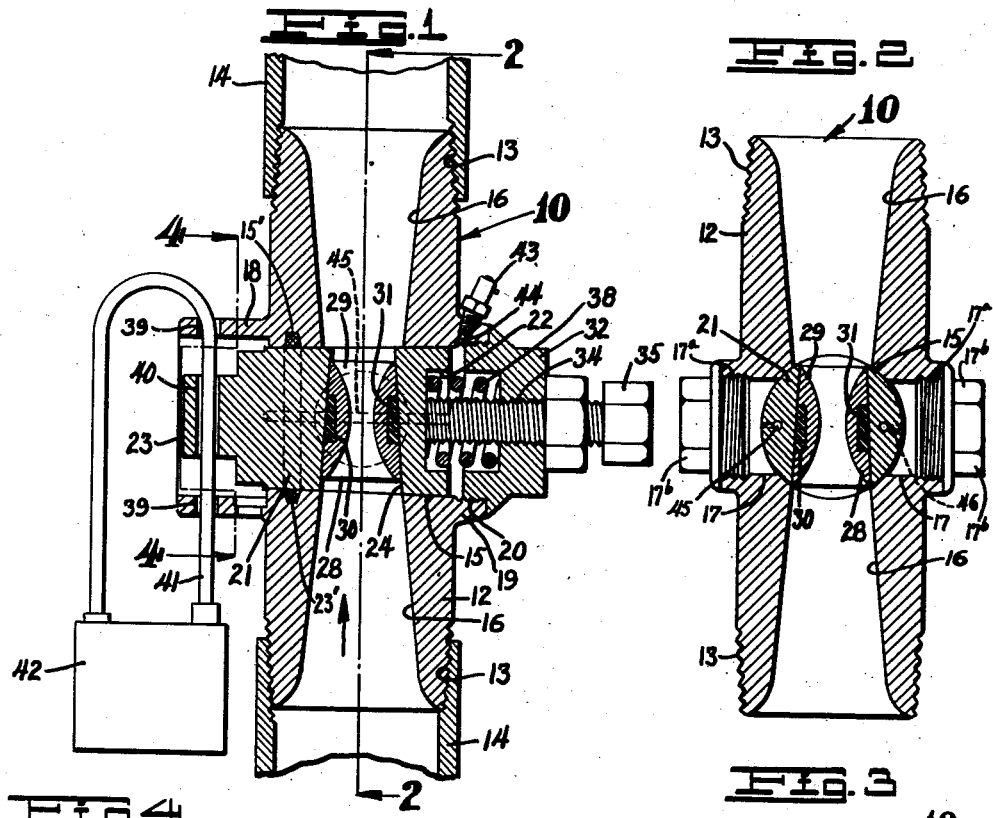
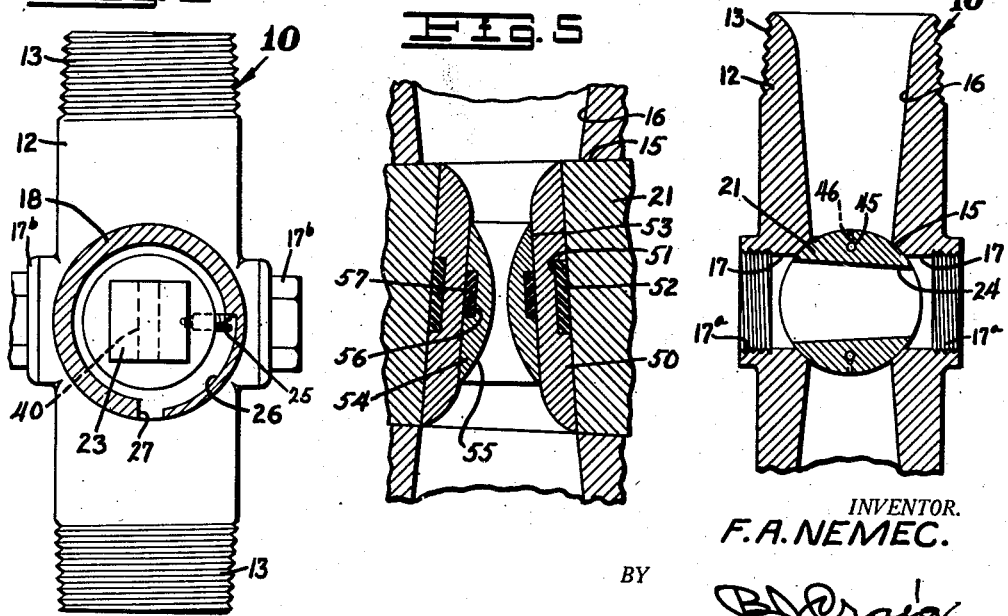
INVENTOR.
F. A. NEMEC.
BY
*B. J. Craig*
ATTORNEY.

Patented May 10, 1932

1,857,321

UNITED STATES PATENT OFFICE

FRED A. NEMEC, OF WHITTIER, CALIFORNIA.

FLUID CONTROL DEVICE

Application filed July 18, 1930. Serial No. 468,906.

This invention relates to improvements in fluid control devices.

The general object of this invention is to provide a fluid control device which includes a flow bean and also operates as a shut-off device.

Another object of the invention is to provide a device of the class described wherein the flow orifice is shaped to cause solid particles in the fluid to seek the center of the stream.

A further object of the invention is to provide a device of the class described wherein the flow bean may be easily and quickly removed.

Other objects and the advantages of this invention will be apparent from the following description taken in connection with the accompanying drawings wherein:

Fig. 1 is a central longitudinal section through my improved fluid control device.

Fig. 2 is a section taken on line 2—2 of Fig. 1.

Fig. 3 is a similar view showing the device in a position to remove the flow bean.

Fig. 4 is a section taken on line 4—4 of Fig. 1, and

Fig. 5 is an enlarged fragmentary section of the device similar to Fig. 1 showing a modified installation of the flow bean.

Referring to the drawings by reference characters I have indicated my improved fluid control device generally at 10. This device may be used to restrict the flow in any type of fluid conducting system but it is particularly adapted for use in combination with an oil well to restrict the flow from the well. As shown, the device 10 comprises a body 12 externally threaded at each end as at 13 for securing it to pipes 14 of a fluid conducting system.

Intermediate the length of the body a tapered aperture 15 arranged at right angles to the longitudinal axis of the body and extending from the aperture 15 to each end of the body I provide apertures 16 which are coaxial with the longitudinal axis of the body. The apertures 16 increase in diameter from their inner ends towards the end of the body. Intermediate the length of the body and arranged at right angles to the longitudinal axis of the body and 90° from the axis of the aperture 15 I provide apertures 17 which communicate with the aperture 15, and include threaded portions 17ª by means of which closure plugs 17ᵇ may be secured in position. At the reduced end of the aperture 15 I provide a sleeve 18 integral with the body and at the large end of the aperture 15 I provide a boss 19 which is internally threaded as at 20.

Positioned in the aperture 15 I provide a tapered plug 21 which at the enlarged end includes a recess 22 and at the reduced end is provided with a reduced polygonal wrench engaging portion 23 which is confined within the sleeve 18.

Positioned in an annular recess 15' in the wall of the aperture 15 and surrounding the plug 21 adjacent the small end thereof I provide a packing member 23'. Extending through the plug 21 at right angles to the axis thereof I provide a tapered bore 24. For limiting the rotation of the plug 21 to a 90° turn I provide thereon a set screw 25 which operates in a recessed portion 26 in the sleeve 18 as clearly shown in Fig. 4.

In one extreme position of the plug 21 the set screw engages the shoulder at one end of the recess 26 and in the other extreme position of the plug the set screw engages the shoulder at the opposite end of the recess. For inserting and removing the set screw 25 I provide an aperture 27 in the sleeve 18 which communicates with the recess 26.

Positioned in the tapered bore 24 of the plug 21 I provide a similarly tapered flow bean 28 which includes a coaxial bore 29 which is flared outwardly toward each end from a reduced intermediate portion. Intermediate the length of the flow bean I provide an annular recess 30 in the outer surface thereof in which I position a collar 31 made of a resilient material such as a good grade of rubber.

Normally the external diameter of the collar 31 is larger than the external diameter of the bean 28 so that when the bean is positioned in the plug bore 24 the collar 31 is For closing the large end of the aperture 15 I provide a cap 32 which includes a reduced externally threaded portion 33 which engages the threads 20 of the boss 19. The cap 32 is provided with a threaded aperture 34 in which the threaded shank of a bolt 35 is positioned. The inner end of the bolt shank is adapted to engage the plug 21 and retain it in tight engagement with the surface of the aperture 15 and to prevent accidental movement of the bolt 35 I provide a lock nut 36. On the inner face of the cap 32 I provide a recess 37 and positioned in the recess 37 and surrounding the bolt 35 I provide a coiled spring 38, one end of which engages the cap 32 and the opposite end engages the plug 21. It will thus be seen that when the bolt 35 is moved out of engagement with the plug 21 the spring 38 resiliently retains the plug in tight engagement with the surface of the body bore 15.

For locking the plug 21 in an open position I provide aligned apertures 39 in the sleeve 18 and an aperture 40 in the wrench engaging portion 23 of the plug in which one arm of the shackle 41 of a padlock 42 may be positioned as shown in Fig. 1.

For lubricating the plug 21 I provide a one-way grease fitting 43 which communicates with the space between the cap 32 and the plug 21 by means of an aperture 44. The plug 21 is provided with a plurality of longitudinal bores 45 which open into the space between the end of the plug and the cap and a plurality of apertures 46 which open through the outer face of the plug and communicate with the longitudinal bores 45 (see Fig. 2). Thus it will be seen that grease forced into the space between the cap and the plug will be forced through the longitudinal apertures 45 of the plug and then out through the apertures 46.

When the device 10 is operatively installed in a fluid system the flow through the device is in the direction indicated by the arrow in Fig. 1 and the device is preferably locked in this position. As the fluid flows through the device the fluid stream is constricted as it passes through the entrance aperture 16 and then still further constricted as it passes through the bean 28 which latter constriction acts to maintain a predetermined pressure in the conduit in front of the device.

As fluid containing solid particles such as sand passes through the device the constricting of the fluid stream in the entrance aperture 16 tends to cause the solids to move toward the center of the stream, whereupon they will not contact with the surface of the entrance aperture 16 or the bean bore 29.

When it is desired to remove a bean and replace it with another the lock 42 is removed, the lock nut 36 loosened and the bolt 35 moved out of engagement with the plug 21. A wrench is then put on the wrench engaging portion 23 and the plug 21 turned 90° to the position shown in Fig. 3 wherein the plug bore 24 is coaxial with the bores 17 in the body. The operator then removes the closure plugs 17ᵇ, inserts a tool through the bore 17 and drives the bean 28 out of the plug bore 24 and replaces it with a new bean, replaces the plugs 17ᵇ and turns the plug 21 to its initial position as shown in Figs. 1 and 2. The bolt 35 is then moved into engagement with the plug 21, the lock nut 36 tightened, and the lock 42 replaced. When the plug 21 is turned to remove the bean 28 the plug stops the flow of fluid through the device.

When the device is used to restrict the flow of an oil well no harm will result from the stopping of the flow of fluid for the few seconds it requires to replace a bean but in systems where the fluid pressure cannot be backed up in advance of the device the fluid can be by-passed through another one of the devices 10 by providing suitable conduits and valves.

In Fig. 5 I have shown a modified form of installation of a flow bean which is adapted to be used in connection with a fluid system, wherein it is required to retain the orifice through the flow bean as nearly as possible the same size constantly and it is necessary to replace the flow bean often.

In this installation a tapered bushing 50 is positioned in the tapered bore 24 of the plug 21. The bushing 50 is preferably provided in its outer surface intermediate the length thereof with an annular recess 51 in which a collar 52, made of a resilient material such as a good grade of rubber, is positioned. The collar 52 like the collar 31 of the bean 28 is in a compressed state when the bushing 50 is positioned in the bore 24 of the plug.

The bushing 50 is provided with a tapered bore 53 which is preferably flared outwardly at each end and in which I provide a tapered flow bean 54. This flow bean includes a bore 55 which is flared outwardly toward each end from a reduced intermediate portion. Intermediate the length of the bean 54 I provide an annular recess 56 in the outer surface thereof in which I position a collar 57 made of a resilient material such as a good grade of rubber which like the collar 31 of the bean 28 is in a compressed state when the bean is positioned in the bore 53 of the bushing 50.

In using the installation shown in Fig. 5, when the bore in the flow bean wears and becomes too large it is only necessary to replace the small flow bean 54 instead of a larger and more expensive one.

From the foregoing description it will be apparent that I have provided a novel fluid control device which is simple in construction and highly efficient in use.

Having thus described my invention, I claim:

1. In a fluid control device, a body having a transverse tapered aperture and a longitudinal aperture on each side of said tapered aperture, said longitudinal aperture being flared outwardly, a tapered plug in said tapered aperture, a cap for the large end of said tapered aperture, a plurality of means to urge said plug to its seat, said plug having a tapered bore, a flow bean removably mounted in said tapered bore, means to releasably lock said plug against rotation when said bean is in flow position, said body having an aperture therein, said last mentioned aperture being disposed adjacent said bean when the latter is in closed position whereby said bean may be replaced without removing said device from a flow line.

2. In a fluid control device, a body having a transverse tapered aperture and a longitudinal aperture on each side of said tapered aperture, said longitudinal apertures being flared outwardly, a tapered plug positioned in said tapered aperture, the large end of said tapered aperture including a threaded portion, a cap, said cap including a threaded portion engaging the threaded portion of said tapered aperture, said cap having a threaded aperture therein, a bolt positioned in said threaded cap aperture, said bolt engaging said plug to force said plug into engagement with the surface of said tapered aperture, a lock nut on said bolt, a coiled spring interposed between said cap and said plug, said spring surrounding said bolt and being adapted to resiliently urge said plug into engagement with the surface of said tapered aperture, said plug having a tapered bore, said bore in one position of said plug being adapted to align with said longitudinal body apertures and a tapered flow bean positioned in said tapered bore, a bore through said flow bean, said bore being flared outwardly from an intermediate point towards each end.

3. In a fluid control device, a body having a transverse tapered aperture and a longitudinal aperture on each side of said tapered aperture, said longitudinal apertures being flared outwardly, a tapered plug positioned in said tapered aperture, a cap closing the large end of said tapered aperture, said cap having a threaded aperture therein, a bolt positioned in said threaded cap aperture, said bolt engaging said plug to force said plug into engagement with the surface of said tapered aperture, a lock nut on said bolt, and other means to urge said plug into engagement with the surface of said tapered aperture, said plug having a tapered bore, said bore in one position of said plug being adapted to align with said longitudinal body apertures, a tapered flow bean positioned in said tapered bore, a bore through said flow bean, said bore being flared outwardly from an intermediate point towards each end, an annular groove in the outer surface of said flow bean intermediate the length thereof, a resilient packing collar positioned in said groove, said collar normally being of greater diameter than the outside diameter of said flow bean and means to lock said plug against rotation.

4. In a fluid control device, a body having a transverse tapered aperture and a longitudinal aperature on each side of said tapered aperture, said longitudinal aperture being flared outwardly a tapered plug positioned in said tapered aperture, a cap closing the large end of said tapered aperture, said cap having a threaded aperture therein, a bolt positioned in said threaded cap aperture, said bolt engaging said plug to force said plug into engagement with the surface of said tapered aperture, spring means to resiliently urge said plug into engagement with the surface of said tapered aperture, said plug having a tapered bore, said bore in one position of said plug being adapted to align with said longitudinal body apertures, a tapered flow bean positioned in said tapered bore, a bore through said flow bean, said flow bean bore being flared outwardly from an intermediate point towards each end, an annular groove in the outer surface of said flow bean intermediate the length thereof; a resilient packing collar positioned in said groove, said collar normally being of greater diameter than the outside diameter of said flow bean, a collar integral with said body and surrounding the small end of said tapered body aperture, a wrench engaging portion on said plug, said wrench engaging portion being within said collar, means to limit the movement of said plug, said collar having aligned apertures, said wrench engaging portion having an aperture, said last aperture in one position of said plug being adapted to align with said collar apertures and a padlock having a shackle positioned in said wrench engaging portion aperture and said collar apertures to lock said plug in a fixed position.

5. In a fluid control device, a body having a transverse tapered aperture and a longitudinal aperture on each side of said tapered aperture, said longitudinal apertures being flared outwardly, a tapered plug positioned in said tapered aperture, the large end of said tapered aperture including a threaded portion, a cap, said cap including a threaded portion engaging the threaded portion of said tapered aperture, said cap having a threaded aperture therein, a bolt positioned in said threaded cap aperture, said bolt engaging said plug to force said plug into engagement with the surface of said tapered aperture, a lock nut on said bolt, a coiled spring interposed between said cap and said plug, said spring surrounding said bolt and being adapted to resiliently urge said plug into engagement with the surface of said tapered aperture, said plug having a tapered bore, said bore in one position of said plug being adapted to align with said longitudinal body apertures, a tapered flow bean positioned in said tapered bore, a bore through said flow bean, said bore being flared outwardly from an intermediate point towards each end, an annular groove in the outer surface of said flow bean intermediate the length thereof, a resilient packing collar positioned in said groove, said collar normally being of greater diameter than the outside diameter of said flow bean, a collar integral with said body and surrounding the small end of said tapered body aperture, a reduced wrench engaging portion on the small end of said plug, said wrench engaging portion being confined within said collar, the inner face of said collar having a groove, a set screw on said plug, said set screw being positioned in said groove, the end walls of said groove limiting the movement of said set screw, said collar having aligned apertures, said wrench engaging portion having an aperture, said last aperture in one position of said plug being adapted to align with said collar apertures and a padlock having a shackle positioned in said wrench engaging portion and said collar apertures to lock said plug in a fixed position.

In testimony whereof, I hereunto affix my signaure.

FRED A. NEMEC.